United States Patent

Sakai

Patent Number: 5,291,007
Date of Patent: Mar. 1, 1994

[54] BAR CODE SCANNER USING A HOLOGRAM DISK AND HAVING DETACHABLE AND ADJUSTABLE OPTICAL ELEMENTS

[75] Inventor: Yasuyuki Sakai, Kariya, Japan

[73] Assignee: Nippondenso Co., Ltd., Kariya, Japan

[21] Appl. No.: 714,029

[22] Filed: Jun. 12, 1991

[30] Foreign Application Priority Data

Jun. 15, 1990 [JP] Japan ................. 2-158390
Mar. 5, 1991 [JP] Japan ................. 3-38779

[51] Int. Cl.⁵ .................................. G06K 7/10
[52] U.S. Cl. .......................... 235/457; 235/462; 235/467; 359/17
[58] Field of Search ............... 235/462, 467, 472, 457; 359/17, 27, 198

[56] References Cited

U.S. PATENT DOCUMENTS

| | | | |
|---|---|---|---|
| 4,057,784 | 11/1977 | Tafoya | 235/467 |
| 4,224,509 | 9/1980 | Cheng | 235/467 |
| 4,369,361 | 1/1983 | Swartz et al. | 235/470 |
| 4,639,070 | 1/1987 | Ikeda et al. | 235/462 |
| 4,678,288 | 7/1987 | Lonsdale et al. | 350/432 |
| 4,736,095 | 4/1988 | Shepard et al. | 235/472 |
| 4,794,237 | 12/1988 | Ferrante | 235/462 |
| 4,930,848 | 6/1990 | Knowles | 235/472 |
| 4,939,356 | 7/1990 | Rando et al. | 235/467 |
| 5,053,612 | 10/1991 | Pielemeier et al. | 235/462 |
| 5,140,141 | 8/1992 | Inagaki et al. | 235/462 |
| 5,153,417 | 10/1992 | Sakai et al. | 235/457 |

FOREIGN PATENT DOCUMENTS

| | | | |
|---|---|---|---|
| 59-187315 | 10/1984 | Japan . | |
| 61-128383 | 6/1986 | Japan . | |
| 63-149774 | 6/1988 | Japan . | |
| 63-192175 | 8/1988 | Japan . | |
| 0305310 | 12/1988 | Japan | 359/198 |
| 2-101594 | 4/1990 | Japan . | |
| 2-101595 | 4/1990 | Japan . | |

*Primary Examiner*—Donald Hajec
*Assistant Examiner*—Esther Chin
*Attorney, Agent, or Firm*—Cushman, Darby & Cushman

[57] ABSTRACT

An information reader, including a light source for emitting a light beam. A photo-detector detects the light beam after it is reflected from a bar code. A rotatable circular hologram disk scans the light beam in two dimensions and guides the light beam reflected to the photo-detector. A prism deflects the light beam emitted from the light source toward the circular hologram disk. A housing receives the light source, the photo-detector the circular hologram disk and the prism therein. The light source and the prism are integrally detachable from the housing. It is thus easy to adjust the incidence angle of the light beam on the circular hologram disk.

28 Claims, 17 Drawing Sheets

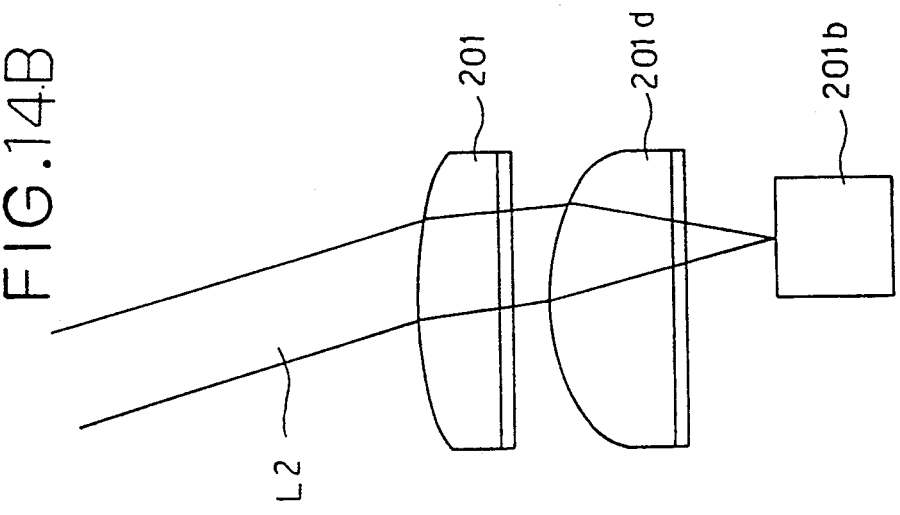
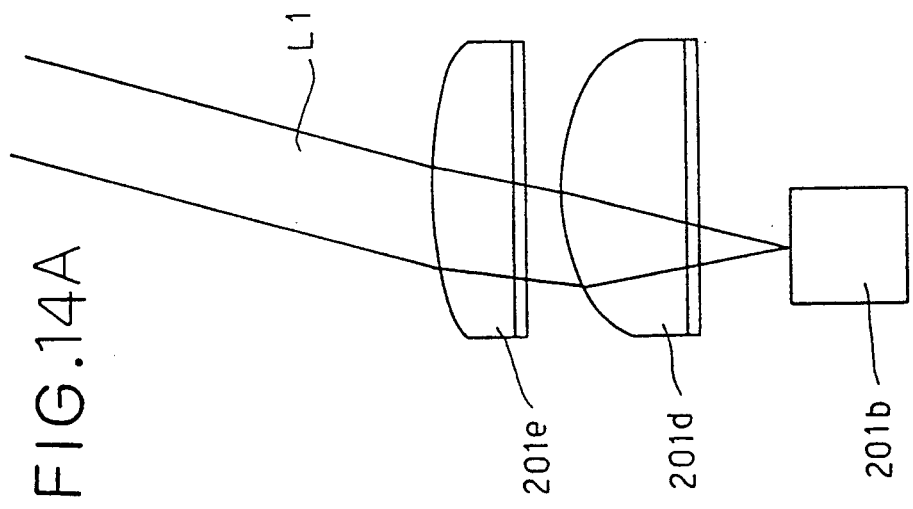

BAR CODE SCANNER USING A HOLOGRAM DISK AND HAVING DETACHABLE AND ADJUSTABLE OPTICAL ELEMENTS

BACKGROUND OF THE INVENTION

1. Field of the Invention

The present invention relates to an information reader. The information reader is utilized as, for instance, a bar code reader. The bar code reader uses a hologram disk for reading the bar code of a bar code label attached to goods to be monitored.

2. Description of the Related Art

Conventional overhead type bar code readers incorporate a scanning unit placed above a path of movement of the goods. The scanning unit has a light source, a scanning system, and a sensing system. The light source emits a scanning light beam downward to read the bar code. In the overhead-type bar code reader, it is desirable to shorten the optical path length in the scanning unit so as to minimize the size of the scanning unit.

Prior Work

To shorten the optical path length, the overhead-type bar code reader described in U.S. patent application Ser. No. 562,865 filed on Aug. 6, 1990, now U.S. Pat. No. 5,153,417, (corresponding to Japanese Patent Application No. Heisei 1-203648) was proposed. In the disclosed bar code reader, a light blocking tube is provided in a condenser lens which collects the laser beam reflected by the bar code label. The light blocking tube extends through the condenser lens along the central optical axis of the condenser lens. A laser beam emitted from a light source is reflected by a reflecting mirror provided on the light blocking tube in a direction to advance along the longitudinal axis of the light blocking tube. The reflected laser beam impinges on a hologram disk at a right angle. The optical path length in the scanning unit of this bar code reader is shortened because the condenser lens as a light-collecting means is disposed near the hologram disk.

However, in the above-mentioned technique, the reflecting mirror and the light source are separately installed in the scanning unit. Therefore, it is easy to misalign the optical axes of the reflecting mirror and the light source. The incidence angle of the reflected laser beam on the hologram disk deviates from perpendicular.

In such a bar code reader, the incidence angle of a light beam on the hologram disk need to be adjusted with high accuracy. This is because the incidence angle has a large effect on the diffraction efficiency of the hologram disk. For instance, when the incidence angle is an unsuitable angle, optical intensity emitted from the hologram disk becomes weak. In such a case, the above-mentioned bar code reader can not read the bar code information accurately.

Moreover, when the optical axes are adjusted relative to each other after assembling, it is very difficult to adjust both of the position of the light blocking tube providing the reflecting mirror and the position of the light source (including the members for fixing these). This is because, after one of these is adjusted, the other need to be adjusted again.

SUMMARY OF THE INVENTION

Accordingly, it is a primary objective of the present invention to provide an information reader in which it is easy to adjust the incidence angle of the light beam on a scanning system.

Another objective of the present invention is to reduce the size of the information reader.

Still another objective of the present invention is to reduce optical noise.

To achieve the foregoing and other objects and in accordance with the purpose of the present invention, an information reader is disclosed which includes a light source for emitting a light beam. A detecting means detects the light beam after it is reflected from an article on which readable information exists. A scanning mean scans the light beam in two dimensions and guides the light beam reflected to the detecting means. A deflecting means deflects the light beam emitted from the light source toward the scanning means. The light source, the detecting means the scanning means and the deflecting means are all installed within a housing. The light source and the deflecting means are integrally detachable to the housing. It is thus easy to adjust the incidence angle of the light beam on the scanning means.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments together with the accompanying drawings in which:

FIG. 14A and 14B are schematic diagrams for explaining the method of adjusting a prism and the semiconductor laser;

DETAILED DESCRIPTION OF THE PREFERRED EMBODIMENTS

The present invention will be described below in greater details with reference to certain preferred embodiment shown in the accompanying drawings.

Figure 1:
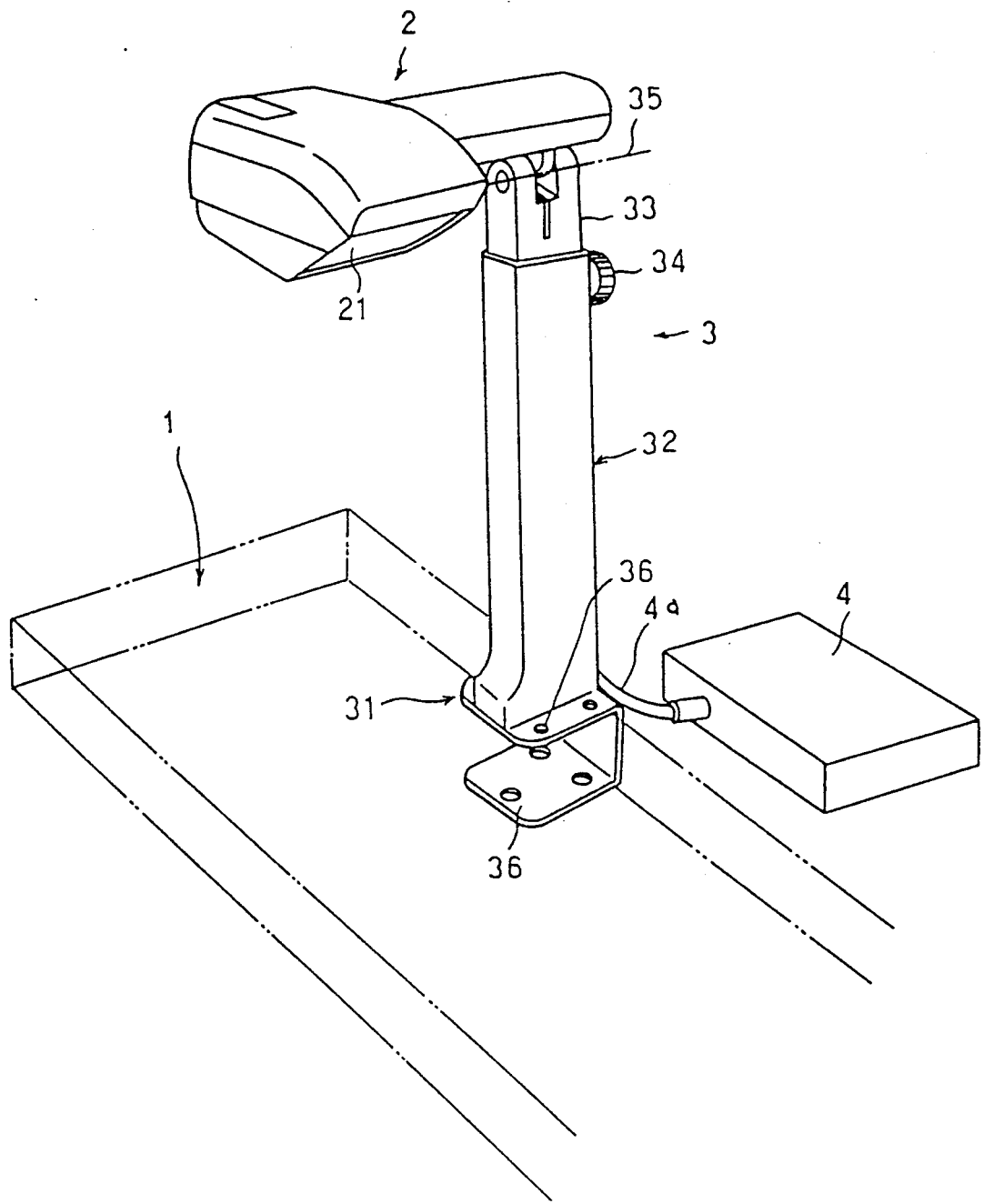
FIG. 1 is a perspective view of a bar code reader according to an embodiment of the present invention.

FIG. 1 illustrates an overhead-type bar code reader of the present invention as it is disposed on a cash register counter. The cash register counter includes a counter table 1 on which a scanning unit 2 of the bar code reader is supported by a support unit 3. The scanning unit 2 is electrically connected with a control circuit 4 by a cable 4a extending through the support unit 3.

A reading signal corresponding to information on a bar code is transferred from the scanning unit 2 to the control circuit 4 through the cable 4a.

The support unit 3 includes a base 31, a first tubular support column 32, and a second tubular support column 33. The base 31 is secured to the counter table 1. The first tubular support column 32 is fixed to and upstanding from the base 31. The second tubular support column 33 is slidably received in the first tubular support column 32. The base 31 has a plurality of holes 36 through which screw fasteners (not shown) extend to mount the bar code reader on the counter table 1.

The second support column 33 is vertically movable in the first support column 32 and can be locked at any desired position by a set screw 34. The scanning unit 2 is pivoted to an upper end of the second support column 33 and is pivotally movable in a vertical plane about a horizontal axis 35.

Figure 2:
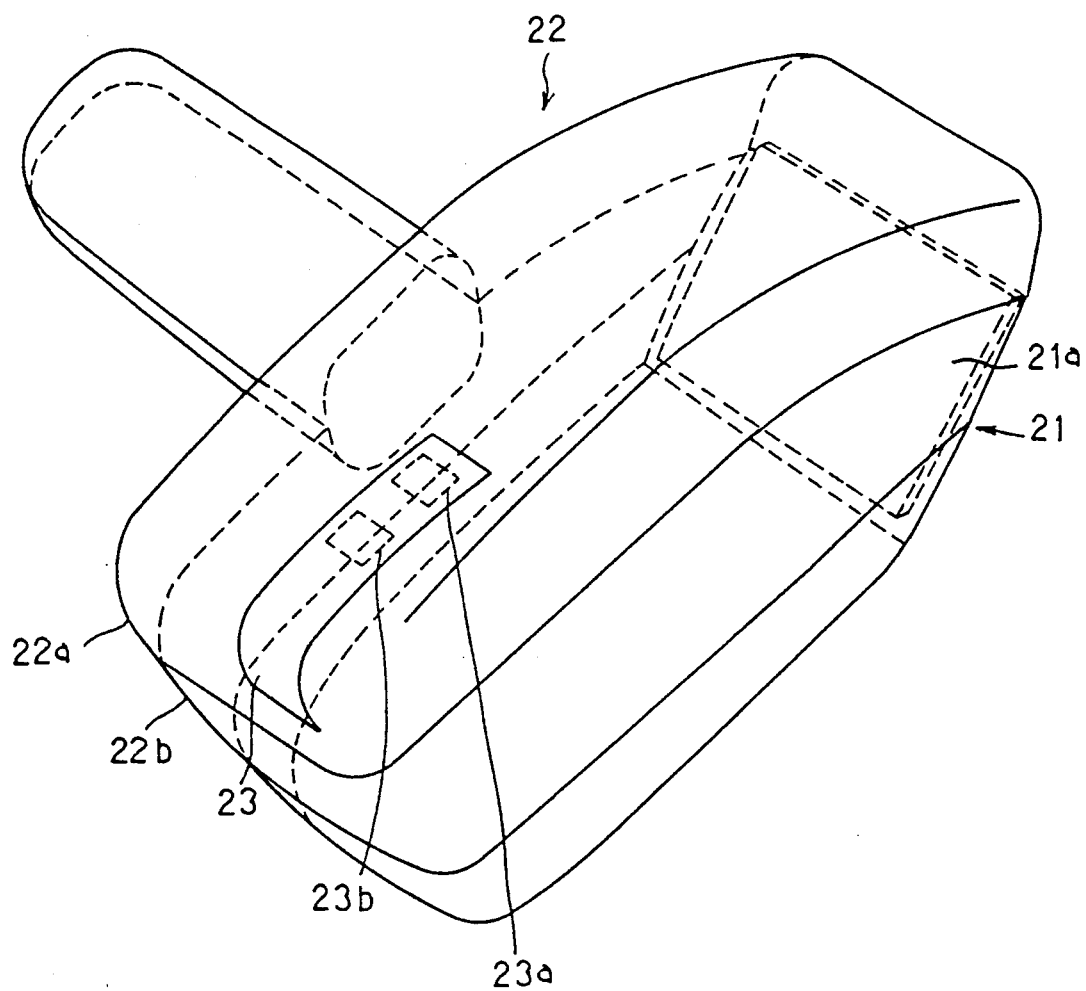
FIG. 2 is an enlarged perspective view of a scanning unit of the bar code reader.

FIG. 2 illustrates the scanning unit 2 as viewed from the upper left thereof.

The scanning unit 2 includes a housing 22 composed of an upper case 22a and a lower case 22b joined together. The scanning unit 2 has a reading window 21 in the lower case 22b and a display window 23 in the upper case 22a.

The reading window 21 is closed by transparent glass 21a. The transparent glass 21a is installed on the lower case 22b at a predetermined angle so that it does not unnecessarily reflect a laser beam passing therethrough. The display window 23 includes a colored transparent plastic plate. A light emitting diode (LED) 23a and another light emitting diode (LED) 23b are disposed in the housing 22 below the display window 23 for indicating the power-on state and the fault bar code reading operation, respectively.

Figure 3:
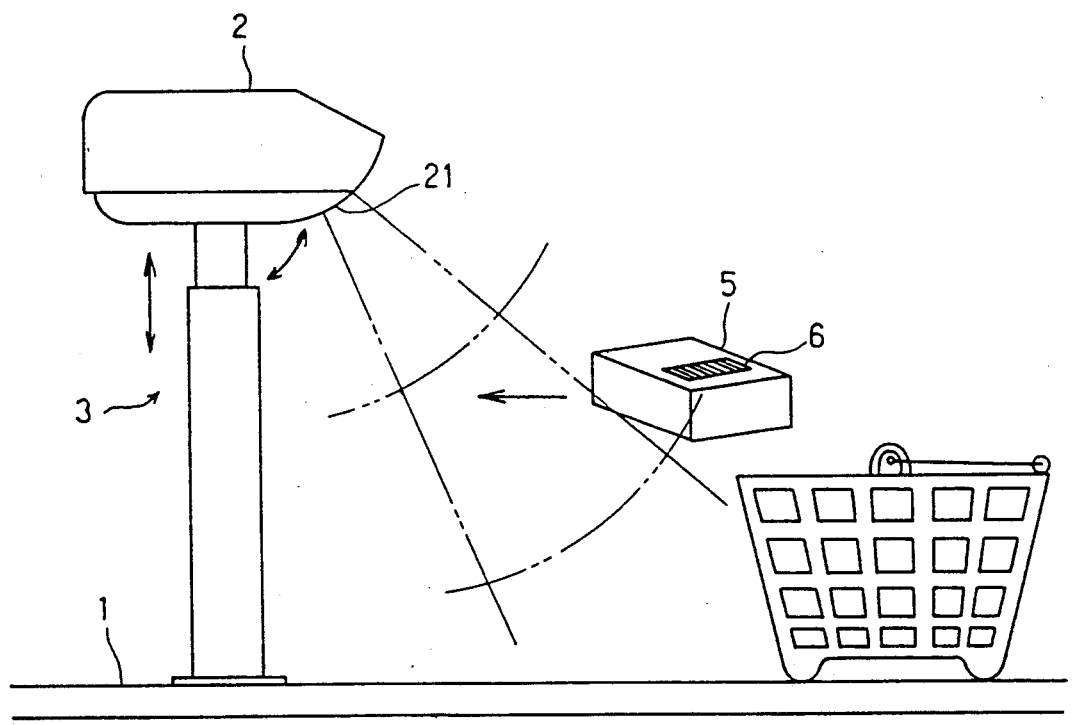
FIG. 3 is a front elevational view of the bar code reader as it is used for reading a bar code label attached to a good.

The bar code reader of the invention is used in the condition as shown in FIG. 3.

The scanning unit 2 disposed over the counter table 1 emits the laser beam through a reading window 21 onto a path of travel of goods at an angle of approximately 45 degrees toward an incoming good 5 so as to scan with the laser beam a zone defined between two-dotted chain lines.

When the cashier moves the good 5 in the direction of the arrow into the scanning zone, a bar code 6 which is generally printed on the surface of a bar code label attached to the outer surface of the good 5 is read. The information on the bar code thus read is decoded by the control circuit 4 and then delivered to a POS(point-of-sale) terminal device (not shown) for the calculation of the volume of sales, etc.

Figure 4:
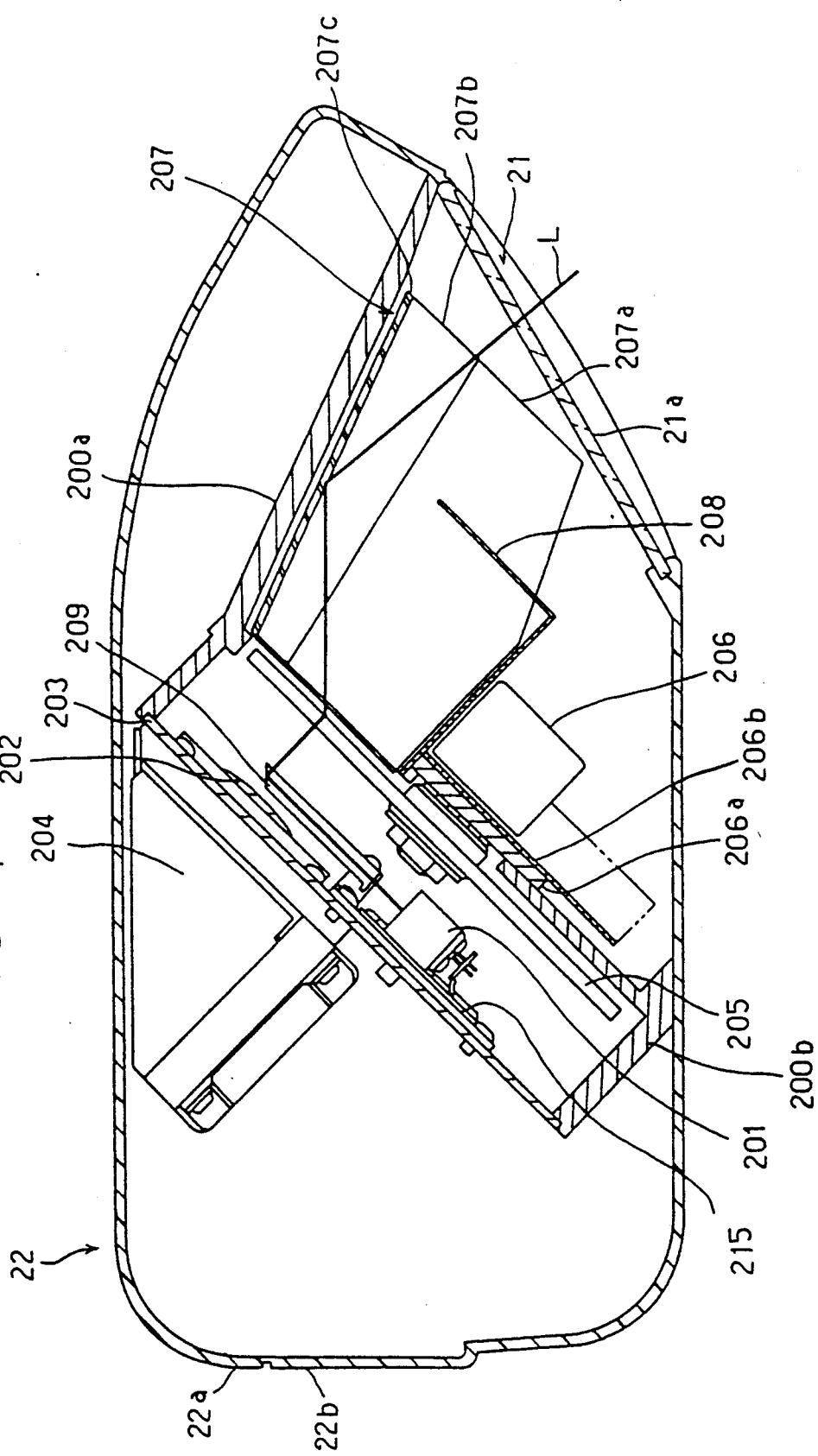
FIG. 4 is a cross-sectional view of the scanning unit.
Figure 5:
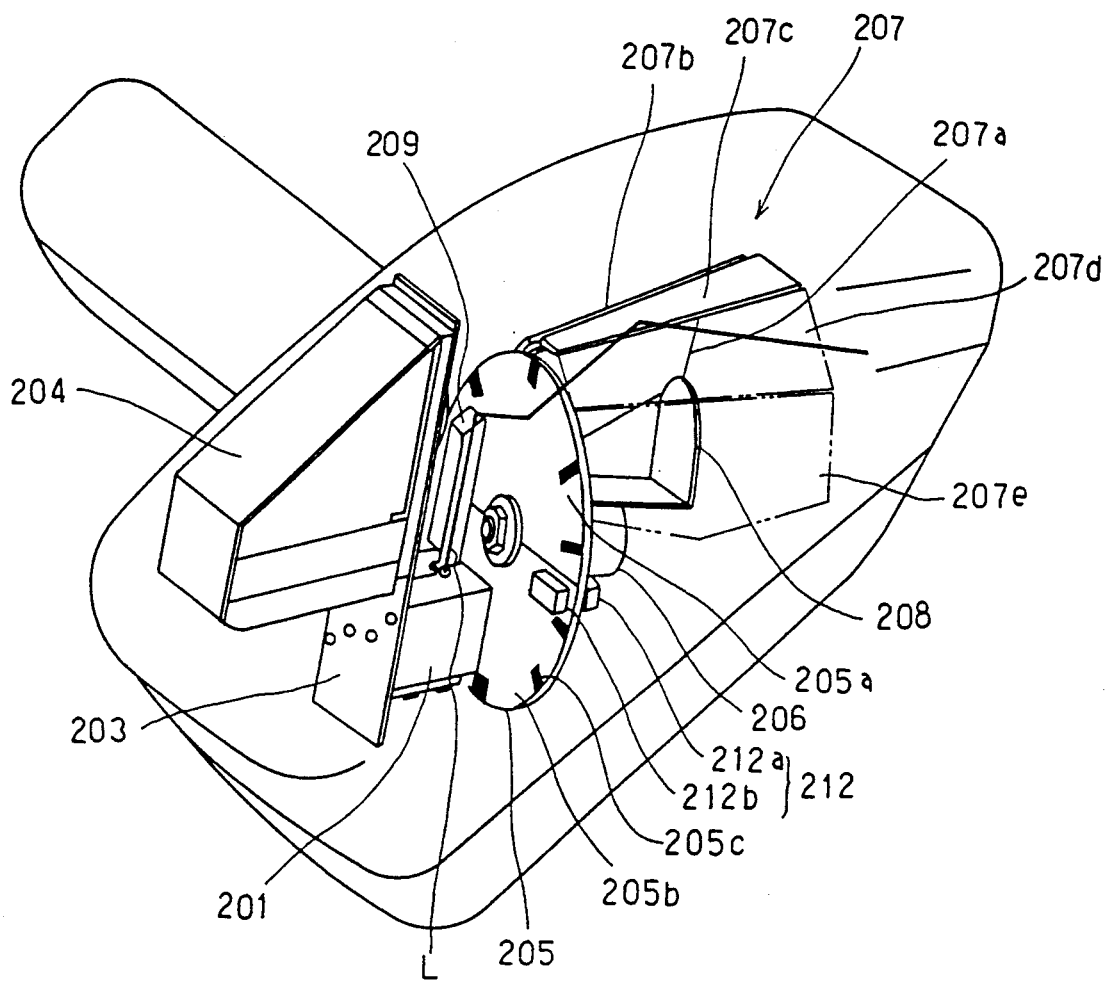
FIG. 5 is a perspective view showing the arrangement of components of an optical system disposed in a housing.

The construction of the scanning unit 2 will be described below in greater details with reference to FIGS. 4 and 5.

A frame 200a and a frame 200b are fixed in the scanning unit 2 and connect to the second support column 33. The frame 200a and the frame 200b constitute a mechanical frame and has a high rigidity in view of the required accuracy of an optical system. It is noted that the frame 200a and the frame 200b are formed as one member.

A circular hologram disk 205 has formed thereon a first hologram 205a and a second hologram 205b which have different focal lengths and different diffraction angles. Each of the first and second holograms 205a, 205b circumferentially extend over an angle of 180 degrees. The holograms 205a, 205b respectively diffract and converge the laser beam impinging thereon.

The laser beam L going out from the hologram disk 205 is reflected by a polygonal reflecting mirror assembly 207 of the reflecting mirrors 207a-207e. A scanning pattern 220 shown in FIG. 6 includes five pairs of spaced scanning lines 220a-220e. Each scanning line pair is formed by one of five flat reflecting mirrors 207a-207e. The reflecting mirrors 207a-207e are arranged in side-by-side juxtaposition and have one side (lower side) open. One of each pair of the scanning lines 220a-220e is formed by the first hologram 205a, while the other of each pair of the scanning lines 220a-220e is formed by the second hologram 205b.

The hologram disk 205 is rotated by a motor 206 whereupon each of the first and second holograms 205a, 205b diffracts the laser beam passing therethrough and lets the outgoing laser beam scan a semicircular range extending through an angle of 180 degrees. Subsequently the reflected laser beam passes through the reading window 21.

The respective reflecting mirrors 207a-207e are fixedly supported by the frame 200a. The scanning pattern and the number of scanning lines can be changed by replacing the polygonal reflecting mirror assembly 207 with another polygonal reflecting mirror assembly having three, four or six reflecting mirrors.

The hologram disk 205 is fixedly mounted on a shaft of the motor 206. The shaft extends through the frame 200b, a motor base 206a and a motor support member 206b. The hologram disk 205 is received in a recess formed by the frame 200b and an optical-system support substrate 203 is placed over the recess to function as a lid. The hologram disk 205 thus received is protected from contamination by dust or dirt and is also prevented from flying out when it is broken.

The motor 206 is of the outer rotor type and is mounted on the frame 200b together with the motor base 206a and the motor support member 206b.

A light blocking plate 208 extends from the frame 200b for shielding or blocking light which is transmitted between the holograms and the reading window 21.

A photo-interrupter 212 is disposed on the frame 200b at a predetermined position. The photo-interrupter 212 is composed of a light emitting element 212a and a light sensitive element 212b confronting each other across the thickness of the hologram disk 205. The hologram disk 205 is provided with a plurality of circumferentially spaced opaque marks 205c at positions corresponding in position to the leading ends (start) and the trailing ends (end) of the respective scanning lines. The marks 205c are detected by the photo-interrupter 212 so that the leading and trailing ends of each scanning line are detected. One of the marks 205c (the bottom mark in the illustrated embodiment) is wider than the remainder. Each revolution of the hologram disk 205 is detected by monitoring a longer duration of a detected pulse signal supplied from the photo-interrupter 212 when the wider mark 205c intersects the photo-interrupter 212.

The optical-system support substrate 203 is fixed at the ends of the frame 200a and the frame 200b so that the support substrate 203 is parallel to the hologram disk 205. The support substrate 203 fixes a condenser lens 202, a sensing system 204, and an incidence optical-system support substrate 215 thereon. The condenser lens 202 collects the laser beam reflected by the bar code label. The sensing system 205 receives the reflected laser beam collected by the condenser lens 202 and obtains an electric signal in accordance with bars and spaces of the bar code 6. The support substrate 215 fixes a semiconductor laser beam source 201 and a prism 209 thereon.

The semiconductor laser beam source 201 includes a laser diode and a lens system therein. The laser diode emits a visible laser beam L. The emitted laser beam L is a collimated or parallel beam of light. The laser beam L advances along the longitudinal axis of the prism 209.

The prism 209 is formed from transparent material such as glass and has an elongate structure. A first end of the prism 209 is connected to the exit hole of the semiconductor laser beam source 201 for guiding the laser beam to a position immediately beneath the condenser lens 202. A second end of the prism 209 is oblique at an angle of 45 degrees to the longitudinal axis of the prism 209 for totally reflecting the laser beam L toward the hologram disk 205. The reflected laser beam L is then emitted at an approximately right angle to the longitudinal axis of the prism 209 and impinges upon the hologram disk 205.

Figure 7:
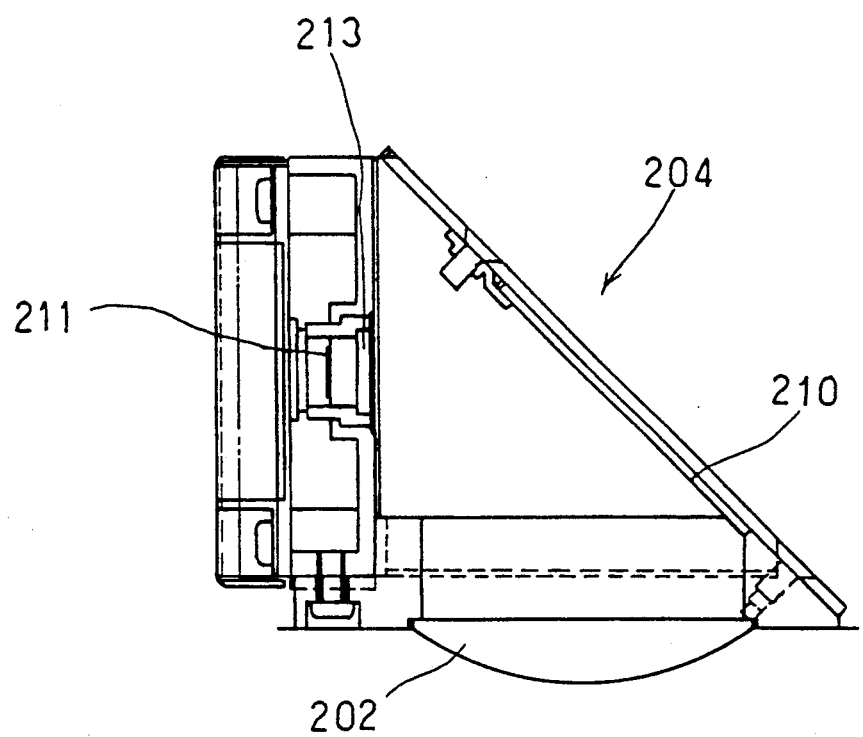
FIG. 7 is a plan view showing the interior construction of a condenser lens and a light-collecting system of the bar code reader.

As shown in FIG. 7, a reflecting mirror 210 reflects the collected laser beam by the condenser lens 202 toward a photo-detector 211 through a band pass filter 213. The reflected laser beam is then focussed on the photo-detector 211. The band pass filter 213 is installed in front of the photo-detector 211 and transmits only the laser beam having a predetermined band of wavelength to the photo-detector 211. The photo-detector 211 produces a train of electric pulses in accordance with the optical intensity of the laser beam. The train of electric pulses is decoded by a decode circuit (not shown) and thereafter is applied to the control circuit 4. It is noted that a decoded signal may be directly applied to any suitable alternative system such as a POS terminal device.

The operation of the bar code reader will be described below with reference to FIGS. 4, 5 and 7.

When a power switch (not shown) is turned on, the power LED 23a is turned on and the hologram disk 205 is rotated by the motor 206. The rotational speed of the hologram disk 205 is increased to such an extent that the rotating hologram disk 205 can scan a laser beam at sufficiently high speeds. Thereafter, the hologram disk 205 is kept in a steady-state rotation. The laser beam is then generated by the semiconductor laser beam source 201. When the rotational speed of the hologram disk 205 slows down, the generation of the laser beam is interrupted so as to prevent a particular point from being irradiated with the laser beam for a prolonged period of time.

The laser beam is then totally reflected by the oblique end of the prism 209 so that it impinges upon the hologram disk 205 at an approximately right angle. The laser beam is diffracted by the first hologram 205a and the second hologram 205b. The diffracted laser beam is then reflected by the polygonal reflecting mirror assembly 207. The reflected laser beam forms a scanning beam focussed on a position which is spaced from the reading window 21 by a predetermined distance. The scanning beam thus formed moves in the scanning pattern shown in FIG. 6 as the hologram disk 205 rotates.

Figure 6:
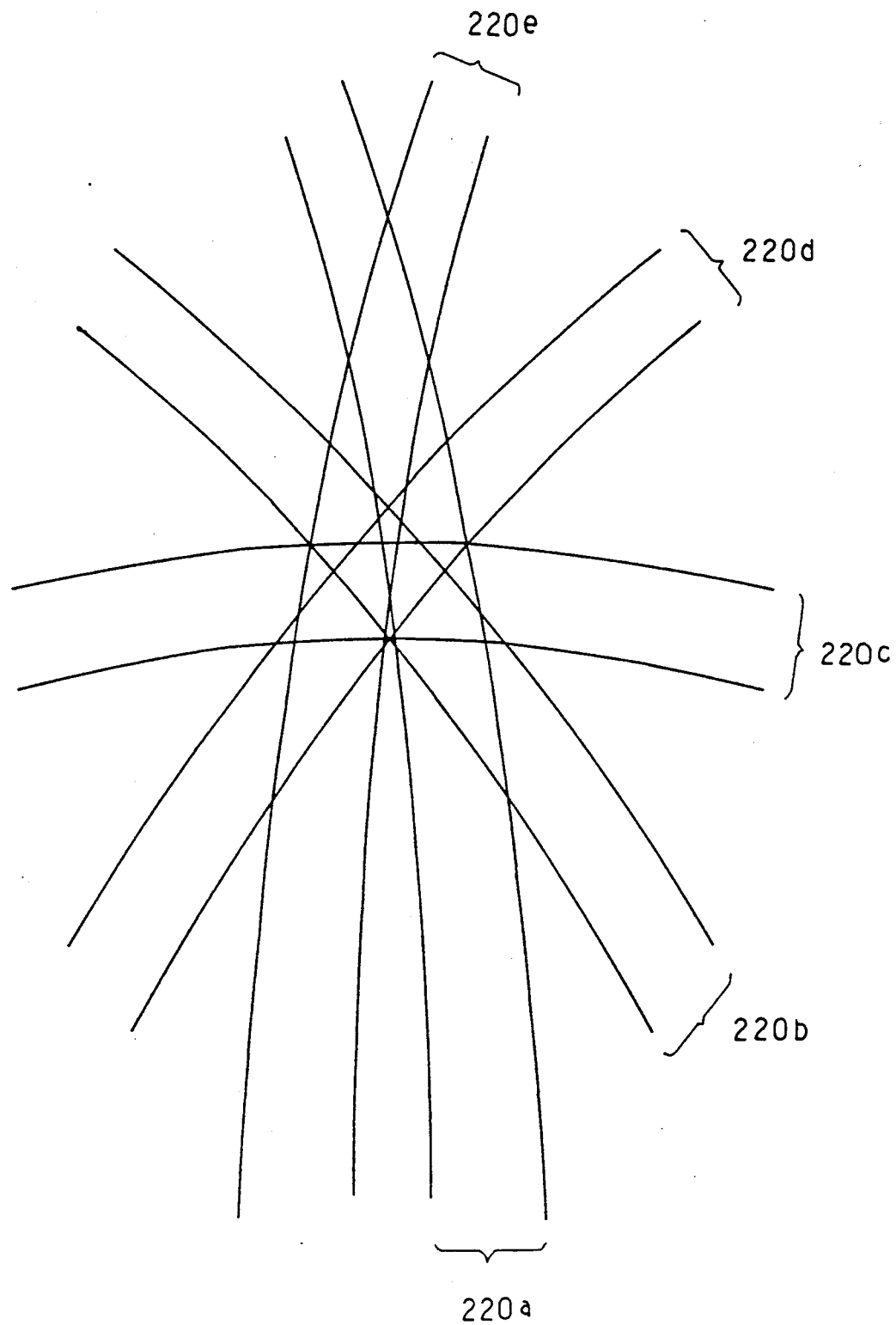
FIG. 6 is a plan view showing a scanning pattern formed by the scanning unit.

When one of the scanning line of the scanning pattern shown in FIG. 6 intersects the bar code of the bar code label, the scanning laser beam is reflected by the bar code label. The intensity of the reflected laser beam changes in accordance with the reflectance of the individual bars and spaces therebetween.

The reflected laser beam goes back toward the hologram disk 205 along the same path as the scanning laser beam has passed and impinges upon the holograms 205a, 205b. Thereafter, the reflected laser beam passes through the condenser lens 202 and the band pass filter 213 and impinges upon the photo-detector 211. The photo-detector 211 in turn produces a train of electric pulse signals which are equivalent to the information on the bar code of the bar code label.

During that time, the photo-interrupter 212 issues timing signals indicative of the leading and trailing ends of each scanning line 220a-220e. The electric pulse signals. from the photo-detector 211 are separated and discriminated as signals obtained by reflection from the respective scanning lines 220a-220e. When a train of electric pulse signals indicative of the information on the bar code is obtained, this train of electric pulse signals is decoded and the output signals are then transmitted to a central processing unit incorporated in the control circuit 4 (FIG. 4).

As described above, since the bar code reader is of the overhead-type in which the scanning unit 2 is disposed above the path of movement of the good 5, the cashier is able to observe the bar code while the bar code is being read by the bar code reader. Moreover, the bar code reader is able to perform a multi-directional scanning.

Here, in the overhead-type bar code reader, it is preferable that the scanning unit 2 be compact in size. The scanning unit 2 of the present embodiment incorporates various structural features which are contributive to the reduction of the overall size of the scanning unit 2, as described below.

The hologram disk 205 is disposed obliquely in the scanning unit 2 so that the overall height of the scanning unit is relatively small.

The first and second holograms 205a, 205b each extend over an angle of 180 degrees about the center of the hologram disk 205 (namely, each hologram 205a, 205b extends along half of the full circumference of the hologram disk 205) and hence scan the laser beam within a semicircular range extending over an angle of 180 degrees. As a result, the polygonal reflecting mirror assembly 207 disposed behind the hologram disk 205 for the formation of the scanning pattern extends substantially along half of the full circumference of the hologram disk 205 (that is, within an angular range of 180 degrees). Therefore, the motor 206 for driving the hologram disk 205 can be disposed on the open side of the polygonal reflecting mirror assembly 207 within the range of a complementary angle of 180 degrees of the same circle. This arrangement of the motor 206 helps reduce the size of the scanning unit 2. Moreover, since the motor 206 is disposed below the polygonal reflecting mirror assembly 207, the center of gravity of the bar code reader is relatively low.

With the view of minimizing the size of the scanning unit 2, the optical system of the scanning unit 2 preferably is as simple as possible.

According to the illustrated embodiment, the scanning laser beam diffracted by the holograms 205a, 205b is reflected just once by the polygonal reflecting mirror assembly 207 before it leaves the scanning unit 2. Accordingly, the laser beam incident upon the holograms 205a, 205b is necessarily directed toward the reading window 21.

With this arrangement, the laser beam which is directed from the semiconductor laser beam source 201 onto the hologram disk 205 may contain a transmitted light component which makes a straight advance to the reading window 21 without being diffracted by the holograms 205a, 205b and directly goes out from the reading window 21. The transmitted light component is reflected by the good, the reflected transmitted light component may be detected by the photo-detector 211 as an optical noise.

In the present embodiment, any such a transmitted light component is blocked by the light blocking plate 208 before it reaches the good 5. The light blocking plate 208 is substantially facing the opening area of the condenser lens 202 so that light coming from the reading window 21 into the scanning unit 2 is prevented from arriving directly at the photo-detector 211. Rather, light incident upon the photo-detector 211 is limited to the light which is reflected by one of the reflecting mirrors 207a–207e and thereafter diffracted by one of the holograms 205a, 205b. Thus, a considerable reduction of the optical noise is attained.

The hologram disk 205 does not have significant focusing ability. Therefore, the hologram disk 205 can not itself focus the laser beam reflected by the bar code label be focussed on the photo-detector 211. The reflected laser beam is focussed by the condenser lens 202 disposed between the hologram disk 205 and the photo-detector 211. In case of a hologram disk having the significant focusing ability, the laser beam incident upon this hologram disk must be divergent light. In contrast, when the hologram disk 205 of the present embodiment is used, the laser beam may be a collimated or parallel beam of light. Thus, the degree of freedom for the kind of the incident light is extended.

When the scanning unit 2 is used with a parallel beam of light, a certain degree of misalignment is permitted between the laser beam source 201 and the hologram disk 205. This is because the parallel beam of light may impinge upon any position of the hologram disk 205 thereby insuring a maximum diffraction efficiency. Consequently, an error which may occur in assembling the condenser lens 202 with the support substrate 203 is accommodated. The bar code reader is assembled without difficulty.

Moreover, when the reflected laser beam is collected by only the hologram disk 205, the scanning unit 2 becomes large because the optical path length between the hologram disk 205 and a focal point becomes long. On the other hand, when the reflected laser beam is collected by the condenser lens 202, the scanning unit 2 can be small because the optical path length can be short.

Outer endmost two reflecting mirrors 207a and 207e of the polygonal reflecting mirror assembly 207 are larger in width than the middle reflecting mirrors 207b, 207c and 207d and extend downward beyond the angular range of 180 degrees stated above. Therefore the light collecting ability is compensated when the reflected light produced along the scanning lines corresponding to the endmost two reflecting mirrors 207a, 207e is collected.

The radius of the condenser lens 202 is in a range of less than a predetermined radius so as to prevent an unwanted laser beam L5 (shown in FIG. 8) from being sensed by the sensing system 204. Therefore, optical noise sensed by the sensing system 204 is reduced. A suitable radius for the condenser lens 202 will be explained below with reference to FIGS. 8–10.

Figure 8:
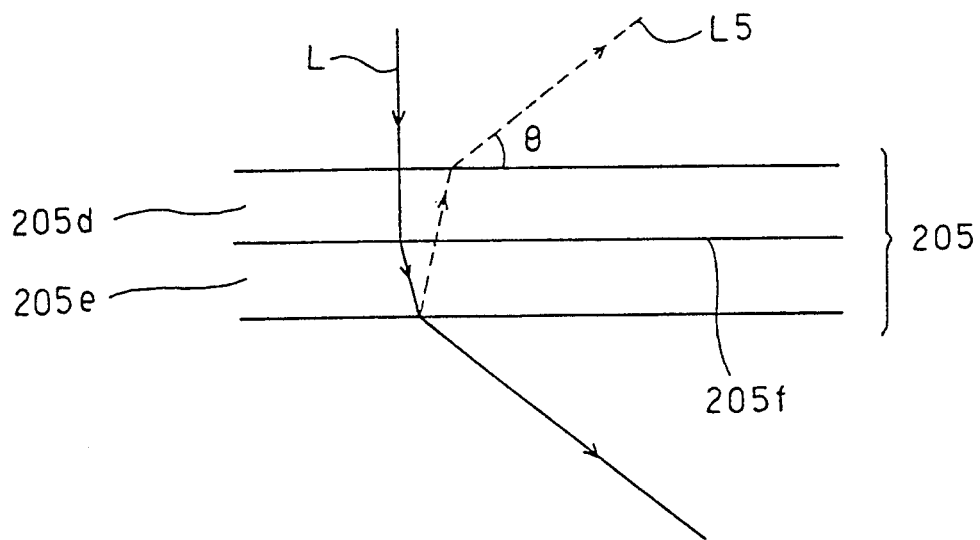
FIG. 8 is a schematic diagram for explaining diffraction in a hologram disk.

As shown in FIG. 8, the hologram disk 205 is composed of glass layers 205d, 205e and a gelatin layer 205f interposed therebetween. When the laser beam L emitted from the prism 209 impinges upon the hologram disk 205, the laser beam is refracted at the gelatin layer 205f, a part of the laser beam L is reflected at a surface of the glass layer 205e, and further, it is diffracted at a surface of the glass layer 205d. As a result, the unwanted laser beam L5 is emitted from the hologram disk 205 toward the condenser lens 202.

Figure 10:
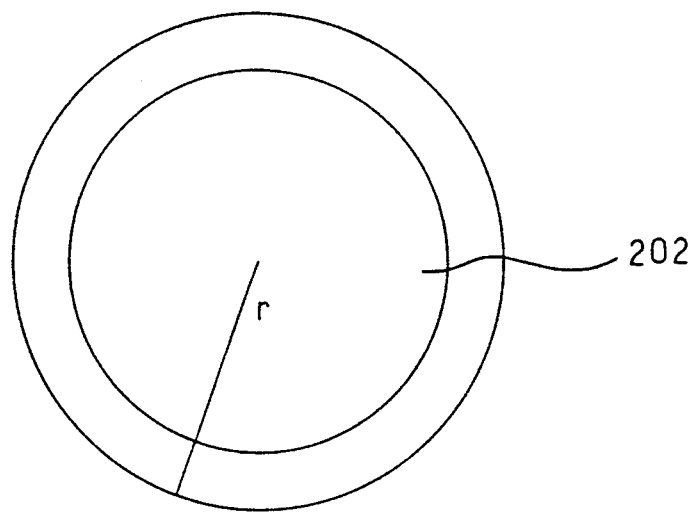
FIG. 10 is a schematic diagram for explaining a suitable radius of the condenser lens of the bar code reader.
Figure 9:
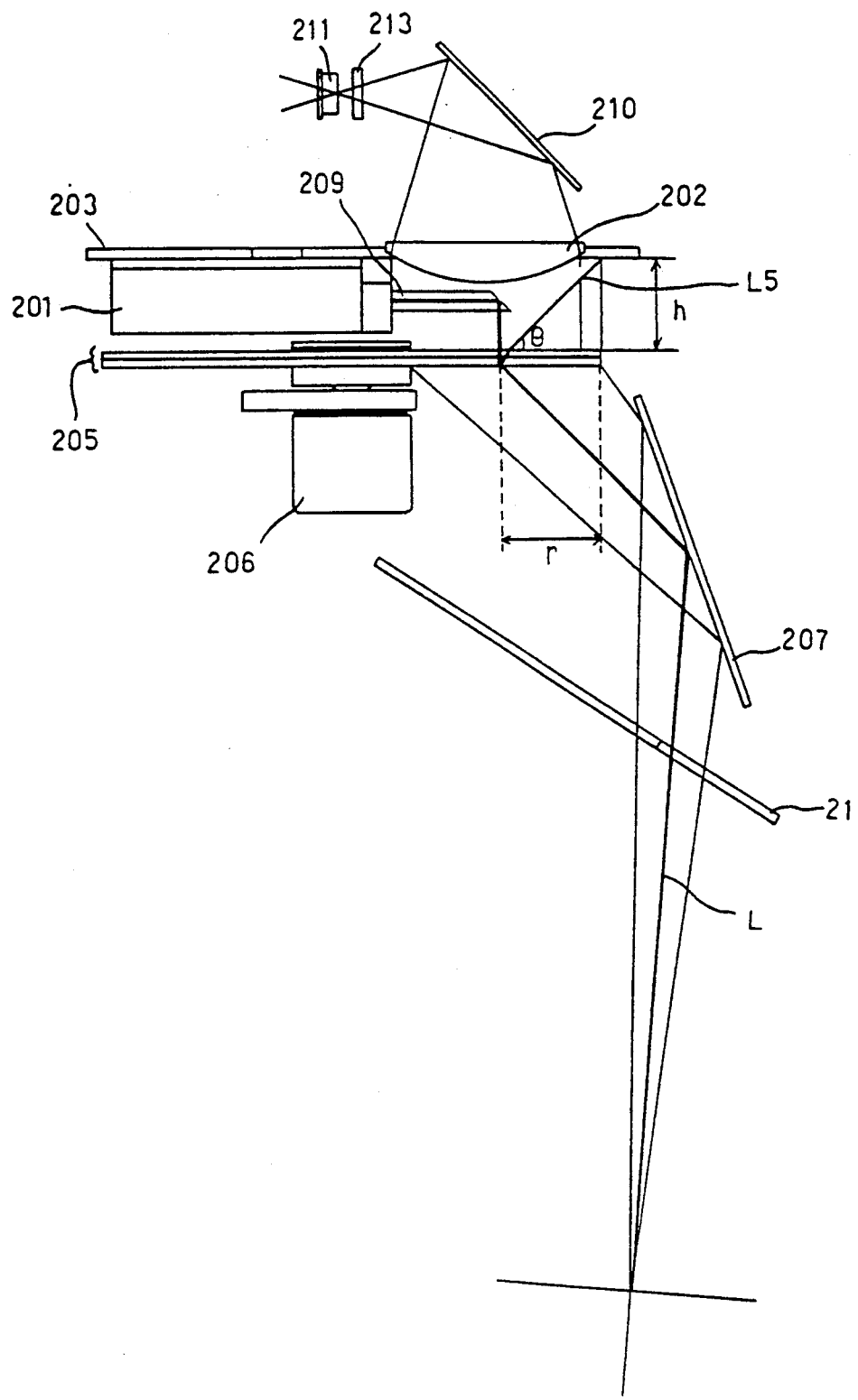
FIG. 9 is a cross-sectional view of the optical system of the bar code reader.
Figure 11A:
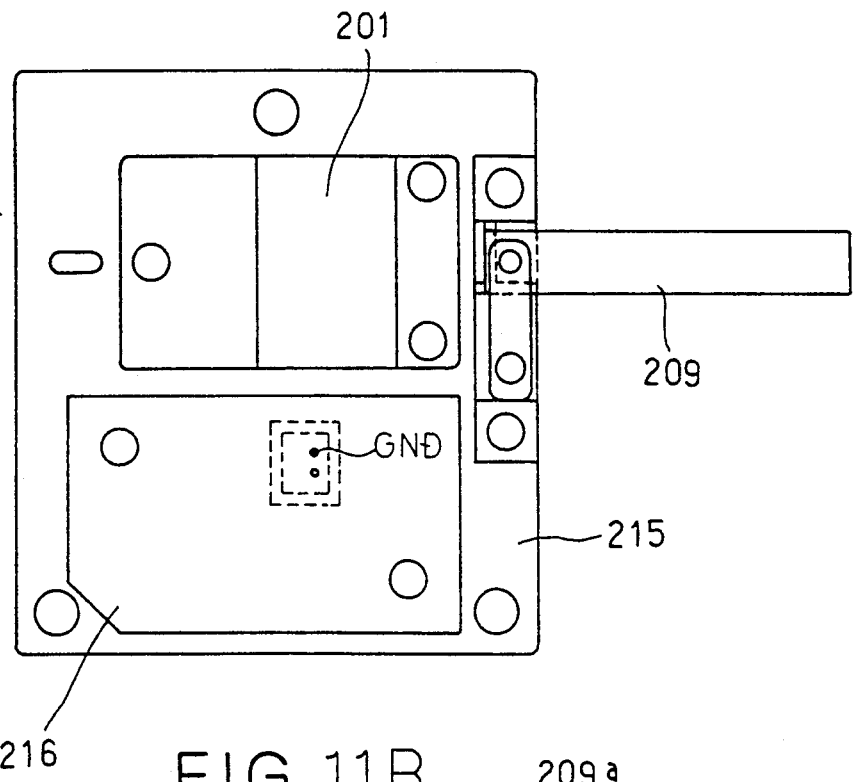
Fig. 11A, 11B and 11C are respectively a plan view, a front view and a rear view showing a construction on a supporting substrate for supporting an incidence optical system of the bar code reader.
Figure 11B:
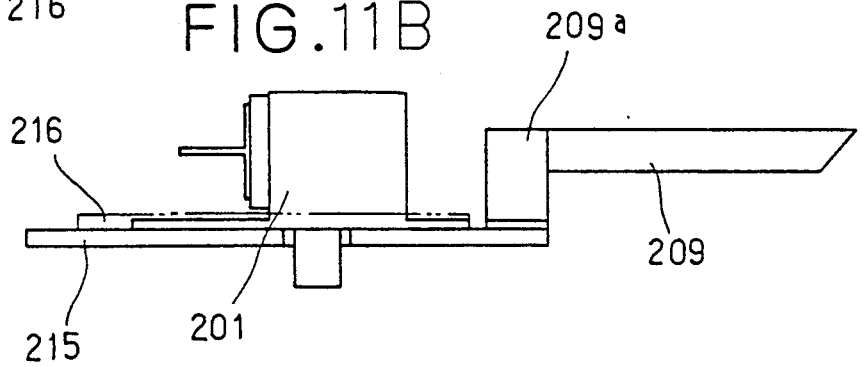
Figure 11C:
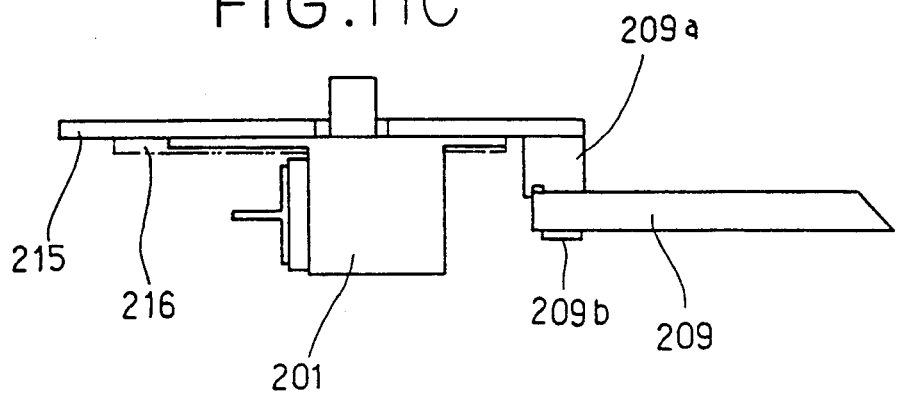
Figure 12A:
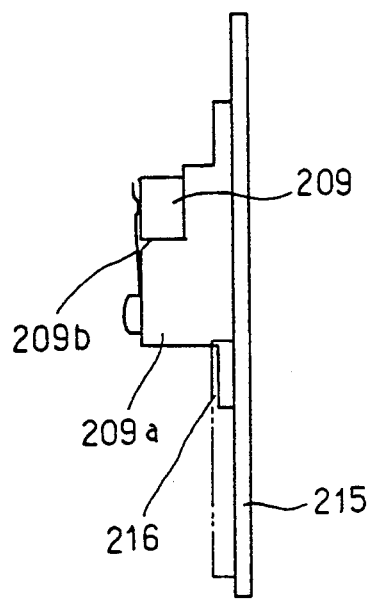
FIG. 12A and 12B are respectively a right-side view and a left-side view showing the construction on the supporting substrate of the incidence optical system.
Figure 12B:
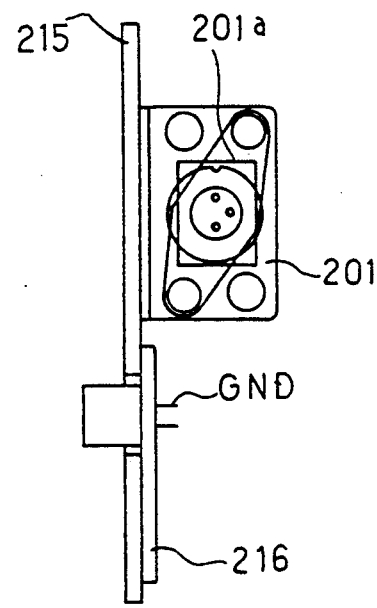

As shown in FIG. 9, the radius r of expanse of the unwanted laser beam L5 is represented by the following equation:

$$r = h/\tan\theta$$

wherein, $\theta$ denotes the angle of departure of the unwanted laser beam L5 to the glass layer 205d; and h denotes a distance between the condenser lens 202 and the glass layer 205d. Therefore, as shown in FIG. 10, it is possible to prevent the unwanted laser beam L5 from being sensed by the sensing system 204 by making the radius of the condenser lens 202 smaller than the above-mentioned radius r.

Components installed on the support substrate 215 will be described below.

Figs. 11A–11C, 12A, and 12B show the construction on the support substrate 215 installing the semiconductor laser beam source 201, the prism 209, and a driving circuit 216. It is noted that screw for fixing the support substrate 215 are omitted in these Figs.

The prism 209 is fastened between a support member 209a and a blade spring 209b. The support member 209a is fixed on the support substrate 215 with such as screws. The blade spring 209b is fixed on the support member 209a with such as screws.

Figure 13:
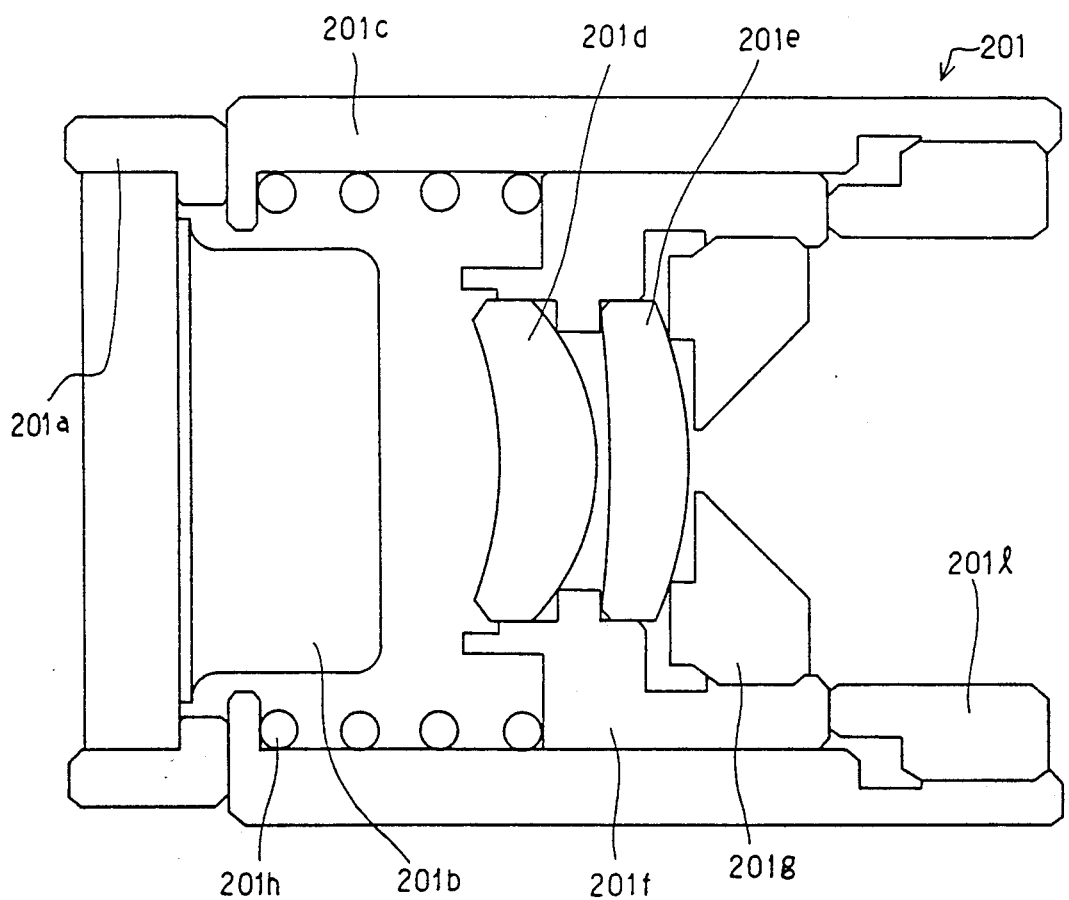
FIG. 13 is a cross-sectional view showing a semiconductor laser beam source of the bar code reader.

The driving circuit 216 is for driving a laser diode 201b shown in FIG. 13.

The semiconductor laser beam source 201 is fixed on the support substrate 215 with such as screws. An adjustment mechanism 201a is provided in first end of the semiconductor laser beam source 201, the first end being opposite to the second end from which the laser beam L is emitted. The laser diode 201b is moved in a vertical direction and a horizontal direction by the adjustment mechanism 201a for emitting the laser beam from the prism 209 at an approximately right angle to the longitudinal axis of the prism 209.

A first meniscus lens 201d and a second meniscus lens 201e are fixed in a housing 201c by a movable member 201f and a lens-fixing member 201g disposed in the movable member 201f. The movable member 201f is movably intervened between a coil spring 201h and a focus-adjusting screw 201l. The movable member 201f approaches or leaves the laser diode 201b in accordance with the rotation of the focus-adjusting screw 201l. Therefore, the first meniscus lens 201d and the second meniscus lens 201e are moved with the movable member 201f for adjusting the focal point of the laser beam L. An outgoing angle of the laser beam L emitted from the prism 209 is adjusted by the adjustment mechanism 201a so that the laser beam L impinges upon the hologram disk 205 at an approximately right angle.

Figure 15:
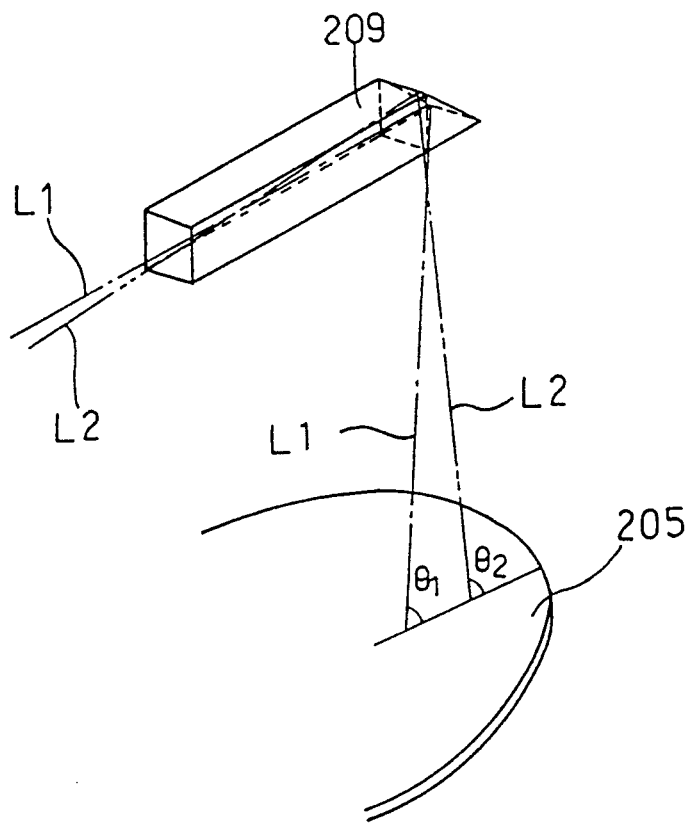
FIG. 15 is a schematic diagram for explaining variation of an incidence angle of a laser beam on the hologram disk in accordance with the adjustment of the prism and the semiconductor laser beam source.

The method of adjusting the outgoing angle will be explained with reference to FIGS. 14A, 14B and 15. It is noted that, although the method will be explained about the movement of the laser diode 201b in only a horizontal direction, the method in a vertical direction is the same as the method in a horizontal direction.

As shown in FIG. 14A, when the laser beam emitted from the laser diode 201b impinges upon the left side of the respective meniscus lenses 201d and 201e, the laser beam is refracted by the respective meniscus lenses 201d and 201e and advances along a line L1. The laser beam is then totally reflected by the oblique end of the prism 209 and impinges upon the hologram disk 205 at an angle of $\theta 1$ as shown in FIG. 15.

On the other hand, as shown in FIG. 14B, when the laser beam emitted from the laser diode 201b impinges upon the right side of the respective meniscus lenses 201d and 201e, the laser beam is refracted by the respective meniscus lenses 201d and 201e and advances along a line L2. The laser beam is then totally reflected by the oblique end of the prism 209 and impinges upon the hologram disk 205 at an angle of $\theta 2$ as shown in FIG. 15.

The adjustment of the outgoing angle is simultaneously carried out in vertical and horizontal directions by an autocollimator. The support substrate 215 is installed on an optical table installed in a horizontal direction. The prism 209 and the semiconductor laser beam source 201 have already been assembled on the support substrate 215. The laser beam L is then emitted from the prism 209 toward the auto collimator installed in a vertical direction. As a result, the emitted laser beam L appears as a luminous point in the visual field of the autocollimator. The position of the laser diode 201b is adjusted by the adjustment mechanism 201a so that the luminous point is on the center of crosshairs which has already been drawn in the visual field. When the luminous point is on the center of crosshairs, the laser beam L is emitted to the optical table at a right angle. Thus, the adjustment for impinging the laser beam L upon the hologram disk 205 at a right angle, is carried out.

As described above, according to the embodiment, the adjustment of the outgoing angle of the laser beam is carried out when the semiconductor laser beam source 201 and the prism 209 are installed on the support substrate 215. Therefore, when the support substrate 215 is assembled in the scanning unit 2, the laser beam impinges upon the hologram disk 205 at a right angle by only fixing the support substrate 203 at the ends of the frame 200a and the frame 200b without adjustment of the outgoing angle of the laser beam. The support substrate 215 fixing the semiconductor laser beam source 201 and the prism 209 is fixed by the support substrate 203. Therefore, the semiconductor laser beam source 201 and the prism 209 are detachably installed in the scanning unit 2.

Moreover, according to the embodiment, the prism 209 formed from transparent material is utilized as a deflecting member for deflecting the laser beam emitted from the semiconductor laser beam source 201. Therefore, when the laser beam transmits in the prism 209, the quantity of light of the laser beam which reaches the photo-detector 211 is hardly reduced. As a result, the photo-detector 211 detects the laser beam having the sufficient quantity of light and the sensitivity of the photo-detector 211 becomes high.

Figure 16:
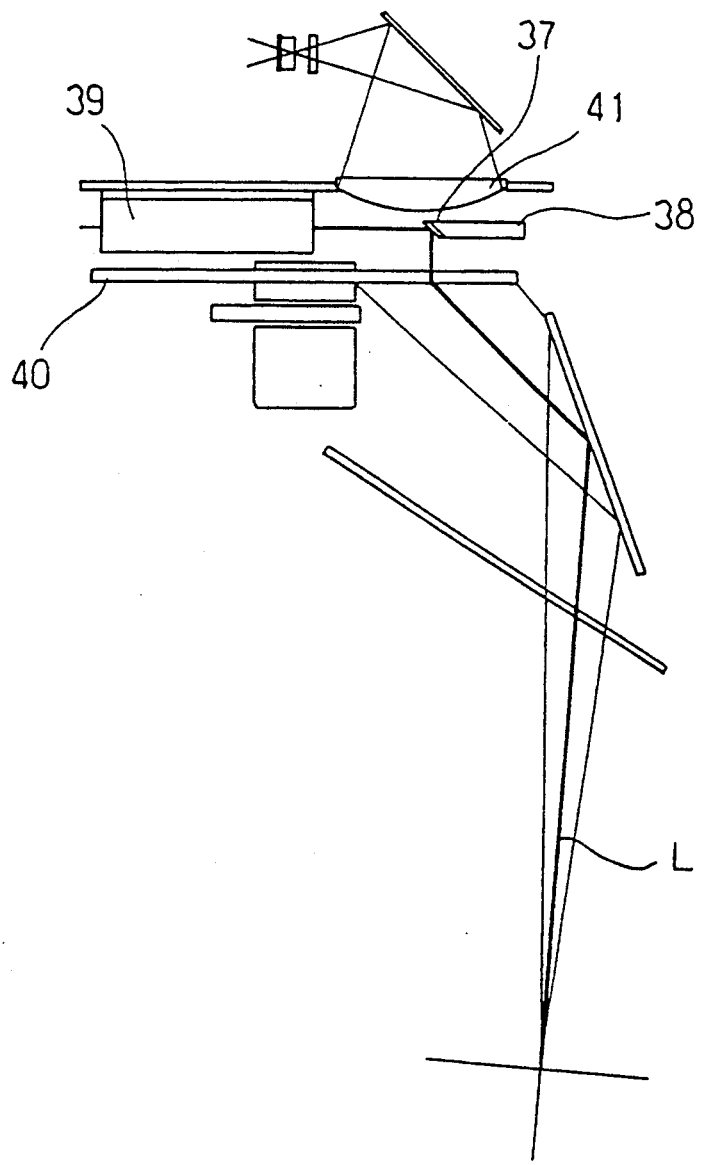
FIG. 16 is a cross-sectional view of an optical system of another embodiment.

FIG. 16 shows another embodiment of the deflecting member. A stay 38 is disposed under a condenser lens 41. The stay 38 is formed from opaque material. A reflecting member 37 is connected to one end of the stay 38. A laser beam L emitted from a laser beam source 39 is reflected by the reflecting member 37 and impinges upon a hologram disk 40 at an approximately right angle. According to this embodiment, it is possible to minimize the size of a scanning unit thereof because the optical path length in the scanning unit is short. However, the laser beam L is blocked by the stay 38 formed from opaque material. The quantity of light of the laser beam which reaches the photo-detector 211 is reduced.

Figure 17:
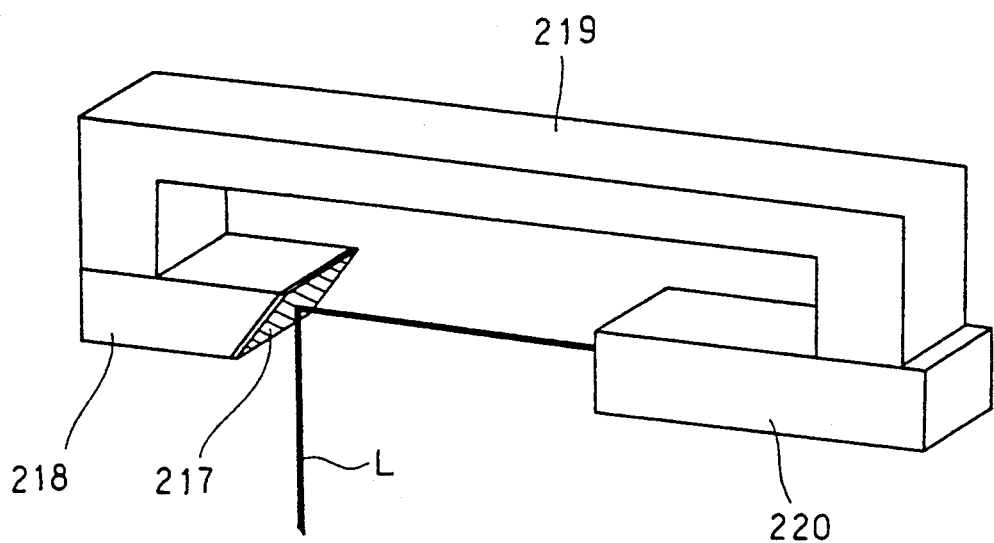
FIG. 17 is a perspective view of means for impinging the laser beam on the hologram disk.

The present invention has been described with reference to the above-mentioned embodiments, but the present invention is not limited to these embodiments and can be modified without departing from the spirit or concept of the present invention, including those enumerated below:

(1) FIG. 17 shows another embodiment of means for impinging the laser beam on the hologram disk 205. A reflecting member 217 such as a reflecting mirror is connected to one end of a transparent member 218. The transparent member 218 and a light source 220 are connected each other with a transparent member 219. In this case, the reflecting member 217 need to be formed as an additional component as compared with the prism 209.

(2) In the above-mentioned embodiment, the laser beam emitted from the semiconductor laser beam source 201 is reflected by the prism 209 and impinges upon the hologram disk 205. However, the laser beam may be diffracted by a hologram formed on an oblique end of a prism and impinges upon the hologram disk 205.

Figure 18:
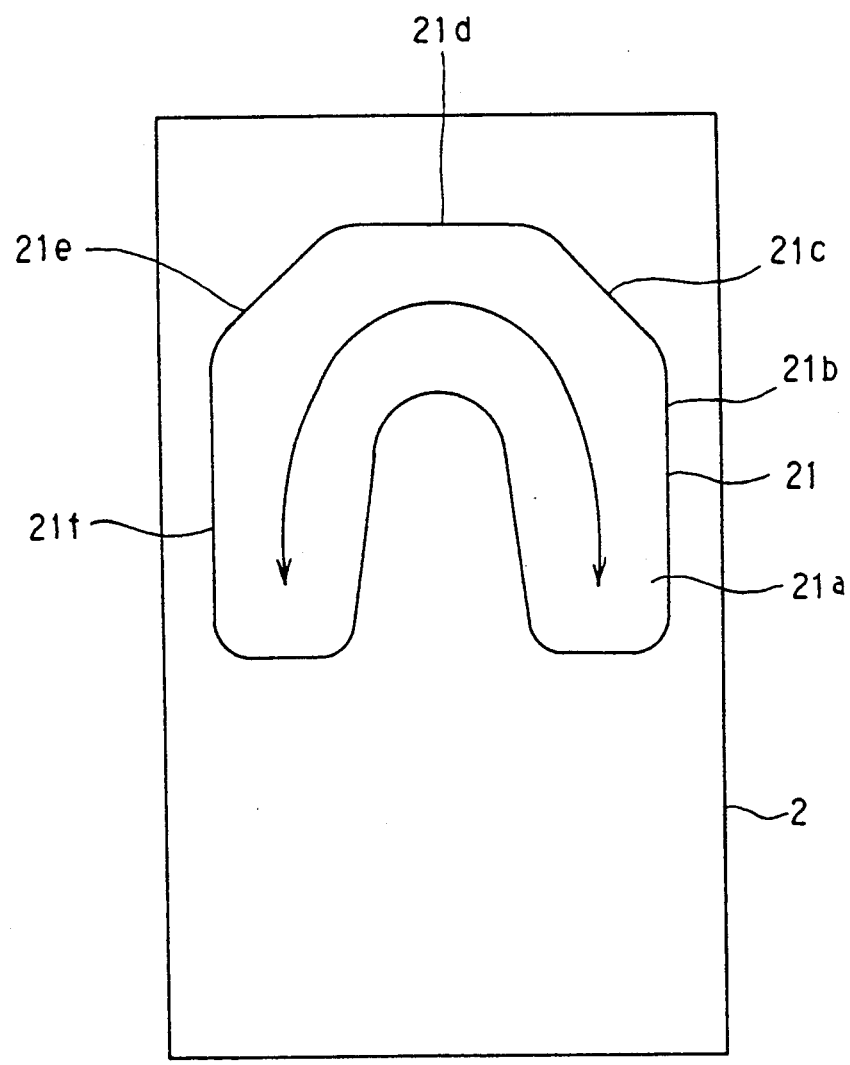
FIG. 18 is a bottom view of a scanning unit of another embodiment.

(3) The light blocking plate 208 may be replaced with a black color plastic film or an opaque plastic film (not shown) which is adhered to the glass 21a in the reading window 21. As an alternative, the light blocking plate 208 may be replaced by a lower case 22b of the scanning unit 2 which has a substantially U-shaped reading window 21, as shown in FIG. 18. The reading window 21 is complementary in contour to the shape of a scanning zone of the laser beam and is partly defined by five sides 21a–21e which are arranged in alignment with the corresponding ones of the reflecting mirrors 207a–207e of the polygonal reflecting mirror assembly 207.

(4) In the above-mentioned embodiment, the support substrate 215 and the support substrate 203 ara respectively provided. However, the support substrate 215 may be omitted. In this case, the semiconductor laser beam source 201 and the prism 209 are directly installed on the support substrate 215. According to this structure, a light-projecting part, composed of the semiconductor laser beam source 201 and the prism 209, and a light-collecting part, composed of the condenser lens 202, are installed on a same datum plane. Therefore, the optical axes of the light-projecting part and the light-collecting part coincide with each other. As a result, the laser beam is accurately focussed on the photo-detector 211.

(5) A concave mirror may be utilized in place of the condenser lens 202.

What is claimed is:

1. An information reader for reading information on an article comprising:
   a light source which is a semiconductor laser beam source which includes a laser diode and a lens system therein, for emitting a laser beam;
   means for detecting said light beam after it is reflected from said article;
   means for scanning said light beam in two dimensions and guiding said refelected light beam to said detecting means;
   means for deflecting said light beam emitted from said light source toward said scanning means;
   a housing for receiving said light source, said detecting means, said means and said deflecting means therein,
   wherein said light source and said deflecting means are integrally detachable from said housing,
   wherein said light source is a semiconductor laser beam source which includes a laser diode and a lens system therein,
   an incidence optical-system support substrate fixed in said housing, wherein said light source and said deflecting means are installed on said incidence optical-system support substrate; and
   an adjustment mechanism provided on said incidence optical-system support substrate for adjusting a position of said laser diode, and wherein said laser diode is moved in a vertical direction and a horizontal direction by said adjustment mechanism.

2. An information reader according to claim 1, wherein said information is a bar code of a bar code lable.

3. An information reader according to claim 1, wherein said scanning means is a rotatable circular hologram disk.

4. An information reader according to claim 1, further comprising a support unit for supporting said case above a path of movement of said article, wherein said light beam is directed downward from said housing.

5. An information reader according to claim 1, further comprising:
   a support unit for supporting said housing above a path of movement of said article;
   a frame fixed in said housing and connecting to said support unit; and
   a second optical-system support substrate fixed to said frame so that said second optical-system support substrate is parallel to said scanning means, wherein said light beam is directed downward from said housing, said incidence optical-system support substrate being fixed on said second optical-system support substrate, and
   wherein said scanning means is a rotatable circular hologram disk.

6. An information reader according to claim 4, further comprising means for collecting said light beam after it is reflected from said article, and for focussing said light beam on said detecting means.

7. An information reader according to claim 6, wherein said collecting means is a condenser lens.

8. An information reader according to claim 7, wherein said deflecting means is disposed between said scanning means and said collecting means.

9. An information reader according to claim 8, wherein said scanning means is a rotatable circular hologram, and said deflecting means is a prism which is formed from a transparent material.

10. An information reader according to claim 8, wherein said deflecting means directs said laser beam onto said scanning means at an approximately right angle, and an optical axis of said deflecting means coincides with that of said collecting means.

11. An information reader according to claim 10, further comprising an optical-system support substrate fixed in said housing, wherein said light source, said deflecting means and said collecting means are installed on said optical-system support substrate.

12. An information reader according to claim 1, wherein said laser beam is a collimated beam of light.

13. An information reader for reading information on an article comprising:
    a light source for emitting a light beam;
    means for detecting said light beam after it is reflected from said article;
    a rotatable circular hologram disk for scanning said light beam in two dimensions and guiding said reflected light beam to said detecting means;
    means for deflecting said light beam emitted from said light source toward said hologram disk; and
    a housing for receiving said light source, said detecting means, said hologram disk and said deflecting means therein,
    wherein said light source and said deflecting means are integrally detachable from said housing,
    wherein said circular hologram disk has a first hologram and a second hologram which have differemt focal lengths and different diffraction angles, each of said first and second holograms circumferentially extending along half of a full circumference of said circular hologram disk.

14. An information reader according to claim 13, wherein said circular hologram disk is composed of a glass layer and a gelatin layer.

15. An information reader according to claim 13, wherein said circular hologram disk is obliquely disposed relative to a horizontal plane in said housing and is driven by a motor.

16. An information reader according to claim 15, further comprising: a polygonal reflecting mirror assembly disposed behind said circular hologram disk for reflecting said light beam scanned by said circular hologram disk, said polygonal reflecting mirror assembly having one side open and extending substantially along half of the full circumference of said circular hologram disk, said motor being disposed on said open side of said polygonal reflecting mirror.

17. An information reader according to claim 16, wherein said polygonal reflecting mirror assembly includes at least three flat reflecting mirrors arranged side-by-side, wherein free edges of the outer endmost two of said reflecting mirrors extend beyond half of the full circumference of said hologram disk.

18. An information reader according to claim 16, further comprising: a support unit for supporting said housing above a path of movement of said article, wherein said light beam is directed downward from said housing.

19. An information reader according to claim 23, further comprising a reading window through which said light beam passes as it leaves the housing in the direction of said bar code, and a light blocking member disposed between said circular hologram disk and said bar code for preventing said light beam transmitted through said circular hologram disk from passing through said reading window without being reflected by said polygonal reflecting mirror assembly.

20. An information reader according to claim 19, further comprising a condenser lens collecting said light beam after it is reflected from said article, focussing said light beam on said detecting means, and facing said circular hologram disk, wherein said light blocking member is facing an open area of said condenser lens.

21. An information reader according to claim 19, wherein said reading window has a shape substantially complementary in contour to a shape of said polygonal reflecting mirror assembly.

22. An information reader according to claim 7, wherein:
said scanning means is a rotatable circular hologram disk, and
a radius of said condenser lens is smaller than a radius r of expanse of an unwanted light beam, the r being given as follows:

$r = h/\tan\theta$ wherein, $\theta$ denotes the angle of departure of said unwanted light beam to said circular hologram disk; and h denotes a distance between said condenser lens and said circular hologram disk.

23. An information reader for reading information on an article, comprising:
a light source for emitting a light beam;
means for detecting said light beam after it is reflected from said article;
a rotatable circular hologram disk scanning said light beam in two dimensions and directing said reflected light beam toward said detecting means;
a condenser lens collecting said light beam after it is reflected from said article and focussing said light beam on said detecting means, said condenser lens facing to said circular hologram disk;
means for deflecting said light beax emitted from said light source toward said circular hologram disk; and
a housing for receiving said light source, said detecting means, said circular hologram disk, said condenser lens and said deflecting means therein, and wherein a radius of said condenser lens is smaller than a radius r of expanse of an unwanted light beam, the radius r being given as follows:

$r = h/\tan\theta$ wherein, $\theta$ denotes an angle of departure of said unwanted light beam to said circular hologram disk; and h denotes a distance between said condenser lens and said circular hologram disk.

24. An information reader according to claim 23, further comprising a support unit supporting said housing above a path of movement of said article, wherein said light beam is directed downward from said housing.

25. An information reader according to claim 23, wherein said deflecting means is disposed between said circular hologram disk and said condenser lens.

26. An information reader according to claim 25, wherein said deflecting means emits light beam onto said circular hologram disk at an approximately right angle, and an optical axis of said deflecting means coincides with that of said condenser lens.

27. An information reader according to claim 26, wherein said deflecting means is a prism, said prism being formed from transparent material and having an elongate structure, said light beam advancing along a longitudinal axis of said prism.

28. An information reader for reading information on an article, comprising:
a light source for emitting a light beam;
means for detecting said light beam after it is reflected from said article;
a rotatable circular hologram disk having a first surface and a second surface opposite to said first surface, scanning said light beam in two dimensions, and guiding said light beam reflected to said detecting means;
a condenser lens collecting said light beam after it is reflected from said article and focusing said light beam on said detecting means, said condenser lens facing said first surface;
means for deflecting said light beam emitted from said light source toward said first surface; and
a housing for receiving said light source, said detecting means, said circular hologram disk, said condenser lens and said deflecting means therein, and
wherein an unwanted light beam is reflected from said first surface, said unwanted light beam is a light beam which is also diffracted at said second surface without being reflected from said second surface, and a radius of said condenser lens is smaller than a radius of expanse of said unwanted light beam on a plane on which said condenser lens is installed.

* * * * *